Aug. 28, 1928.

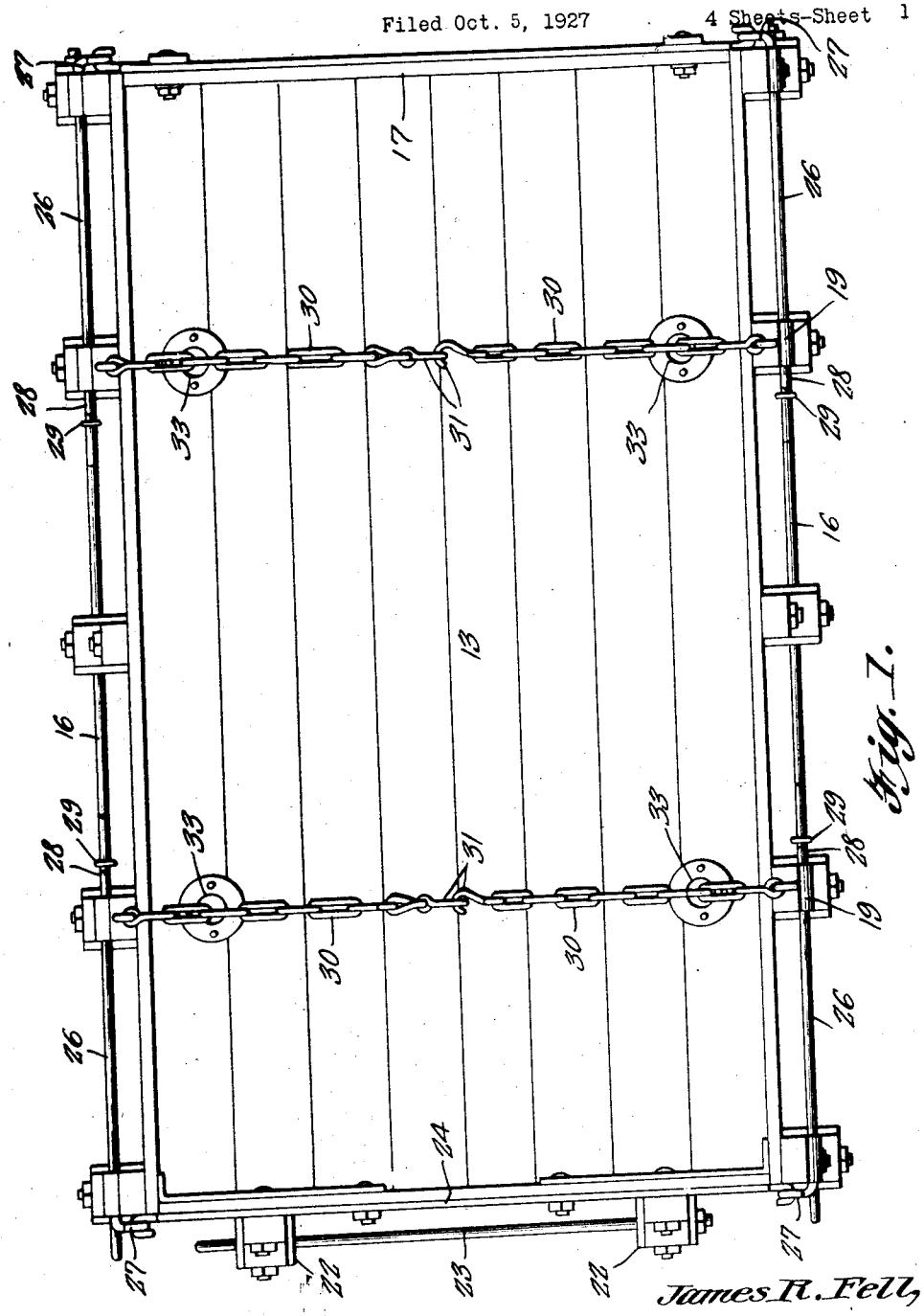

J. R. FELL 1,682,610

VEHICLE TRUCK BED

Filed Oct. 5, 1927     4 Sheets-Sheet 2

James R. Fell,
INVENTOR

BY Victor J. Evans
ATTORNEY

WITNESS: P. J. Hickey

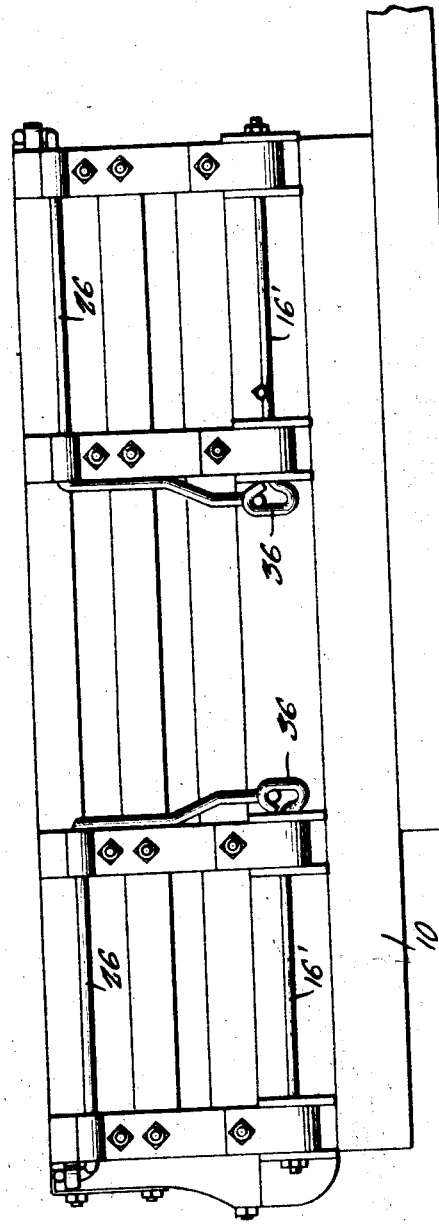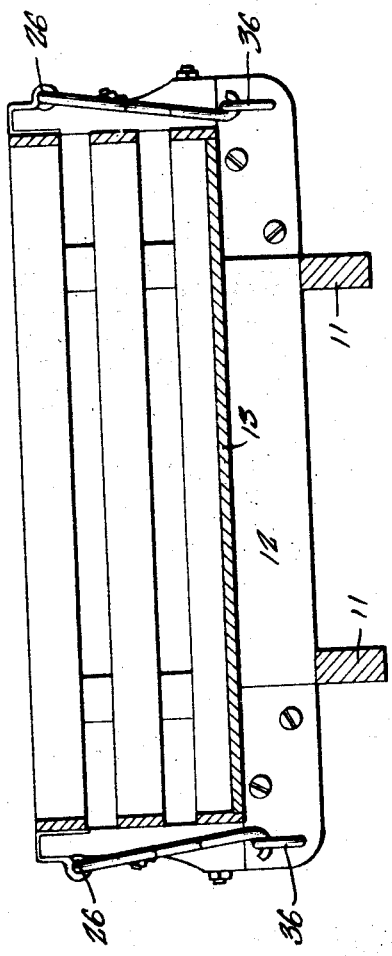

Aug. 28, 1928.
J. R. FELL
1,682,610
VEHICLE TRUCK BED
Filed Oct. 5, 1927 4 Sheets-Sheet 4
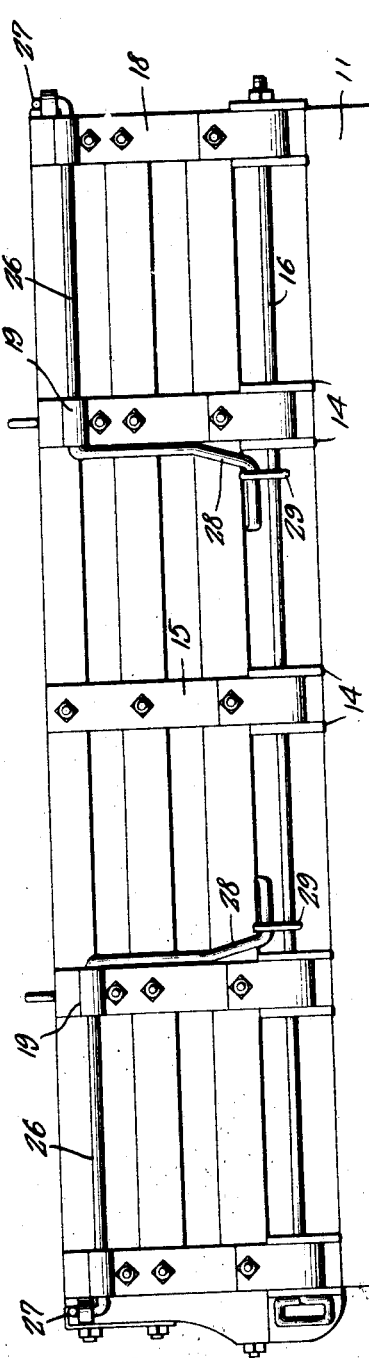
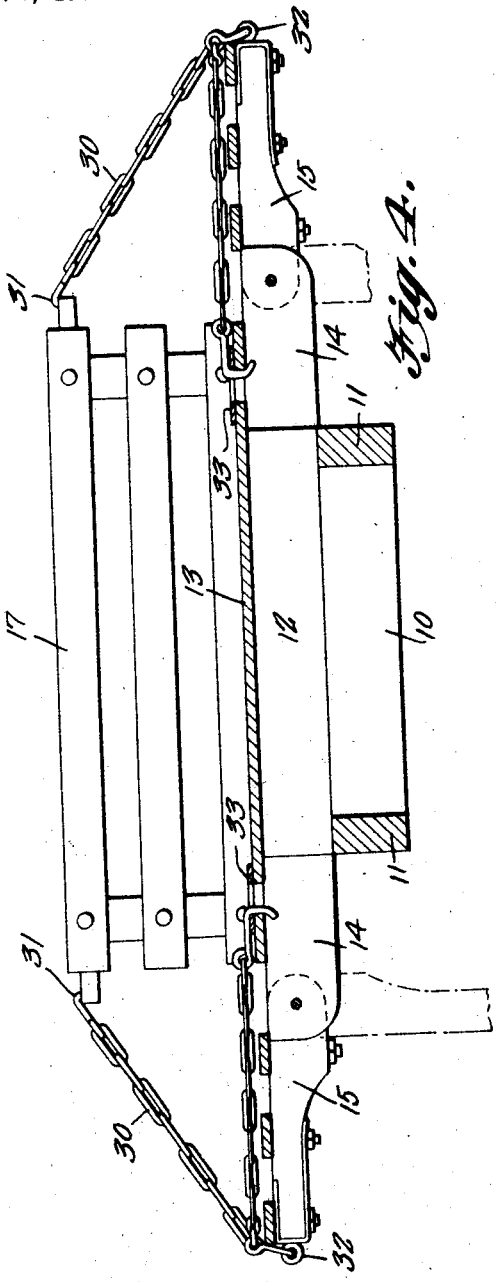
James R. Fell,
INVENTOR
BY Victor J. Evans
ATTORNEY Patented Aug. 28, 1928.

1,682,610

UNITED STATES PATENT OFFICE.

JAMES R. FELL, OF HALEYVILLE, ALABAMA, ASSIGNOR TO WILLIAM F. DILLARD, OF HALEYVILLE, ALABAMA.

VEHICLE TRUCK BED.

Application filed October 5, 1927. Serial No. 224,258.

This invention relates to improvements in vehicle truck beds and which embodies among other characteristics means for extending the sides thereof to facilitate the loading and transportation of flat material.

Another object of the invention comprehends a locking mechanism for holding the sides in upright positions.

A further object of the invention contemplates a false bed adapted to divert the load toward the sides of the bed in order that the load will be easily dumped when the sides are lowered.

With the above and other objects in view, the invention further consists of the following novel features and details of construction, to be hereinafter more fully described, illustrated in the accompanying drawing and pointed out in the appended claims.

In the drawings:

Figure 1 is a top plan view of the invention.

Figure 2 is a side elevation thereof.

Figure 4 is a transverse sectional view taken through the invention with the sides extended.

Figure 6 is a side elevation of a modified method for mounting the sides.

Figure 7 is a transverse sectional view taken through the embodiment of the invention as disclosed in Figure 6 of the drawings and of a different form of locking mechanism engageable with the ends of the bed.

Figure 3:
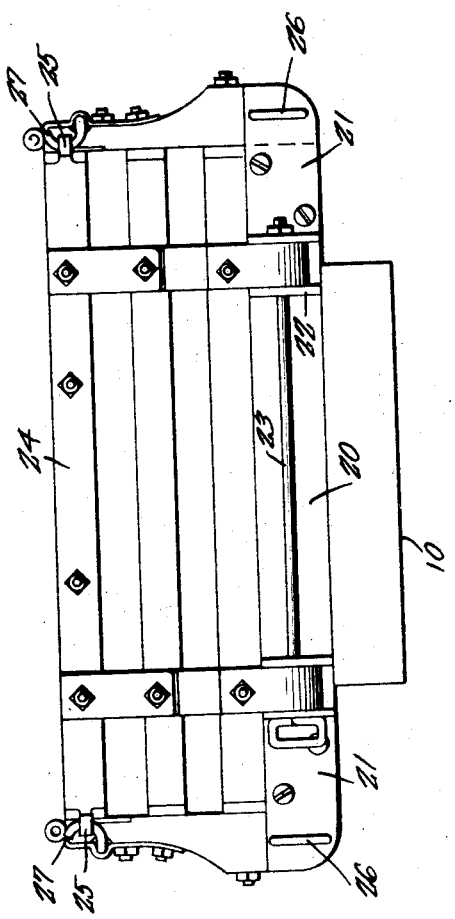
Figure 3 is an end elevation of the bed, illustrating the connection of the swingably mounted end gate therefor.
Figure 5:
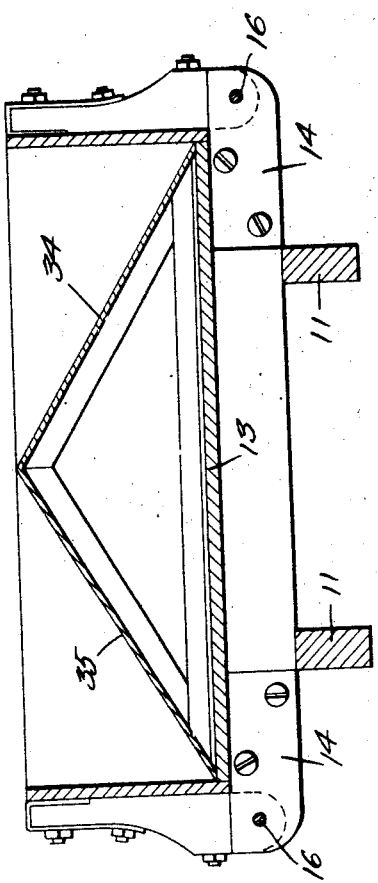
Figure 5 is a similar view taken through a modified form of the invention having solid sides and false bed for directing the load toward the sides, the latter when lowered permitting the load to be dumped.

Referring to the drawings in detail, wherein like characters of reference denote corresponding parts, the reference characters 10 indicate bolster supports extended transversely of a vehicle chassis and having connection at the ends thereof with main hounds 11 to provide a frame structure upon which bolsters 12 may be supported. The bolsters extend for appreciable distances beyond the outer sides of the main hounds 11. A platform 13 being carried upon the upper sides of the bolsters 12 in the manner as illustrated in Figures 5 and 7 of the drawings.

Plate members 14 carried upon the opposed sides of the bolsters 12 adjacent the extremities thereof are extended for appreciable distances of their lengths beyond the extremities of said bolsters to pivotally and swingably mount the lower ends of bolster stakes 15 therebetween upon shaft members 16 extended therethrough. Slats 17 being arranged upon the bolster stakes 15 to prevent displacement of a load shifted upon the bed 13 when the vehicle is in transit. Plate members 18 are carried upon the outer sides and adjacent the upper ends of the bolster stakes 15 adjacent the end of the bed and which are provided with sleeve portions 19, the purpose of which will be readily apparent.

That portion of the bed adjacent the cab, not shown, of a vehicle, is built up after the manner of the sides save for the bolster stakes in so far as such end is to be rigid and incapable of swinging movement. The remote end of the bed is constructed in accordance with the construction evolved in that of the sides in so far as the particular end is to serve as an end gate and to swing downwardly from the platform 13. Plate members 20 and 21 carried upon the outer sides of one of the hounds 11 are provided with offset extremities 22 adjacent the meeting portions thereof between which and upon a rod 23 the end gate is mounted. The uppermost slats for the ends of the truck bed are provided with plate members 24, terminating in reversely curved hook portions 25. Locking rods 26, operable within the sleeve portions 19 of the plate members 18, terminate to provide hook members 27 upon their outer ends adapted for connection with the reversely curved hook portions 25 of the plate members 24. The opposed or inner ends of the locking rods 26 provide crank portions 28, the offset portions thereof being extended in parallelism with that of the rods 16. Rings 29 slidably mounted upon the rods 16 are adapted to receive the shorter offset portions of the cranks 18 whereby the hook portions may be constantly engaged.

When the sides are extended for use in the manner as illustrated in Figure 4 of the drawings, chain members 30, having hooks 31 upon the ends thereof, are adapted for connection with screw eyes 32 in the free ends of the bolster stakes 15 and the reversely curved hook portions 25 of the plate members 24. Some of the chains having connection with apertured plate members 33 carried upon the upper side of the platform 13 whereby the sides may be rigidly held in extended positions.

As illustrated in Figure 1 of the drawings, the chains may be effectively arranged when the sides are arranged upright to not only strengthen and support the sides but which may also extend over portions of a load to hold the same steady and against displacement incident to breakage.

In Figure 5 of the drawings, I have illustrated a modified form of truck bed or platform which may serve as an auxiliary to the platform 13. The modification embodies a triangular frame structure 34, the base of which being seated upon the platform 13. Side panels 35 carried upon the outer surfaces of the rising portions of the frame structure serve to separate the load to prevent shifting of the same upon one side of the vehicle, which frequently causes axles and springs to break. When the aforementioned type of auxiliary bed is employed solid sides are carried upon the bolster stakes 15. When the sides are lowered, the load may be conveniently dumped without raising or tilting the platform. Burlap or other coarse fabric may be effectively employed as curtains upon the inner sides of the slats for the sides and end gate to prevent loss of the load when the modified form of bed is called into use.

In Figures 6 and 7 of the drawings, I have illustrated a modified form of truck bed which differentiates from the construction of the preferred form of the invention in that two rods 16' are employed instead of one, the inner ends of which terminate to provide enlarged loops or finger engaging portions 36. The identical form of locking mechanism is employed save that the shorter offset portions thereof are extended at right angles to the rods 16' for insertion within the enclosures of the enlarged looped portions 35 of said rods. Such construction obviates the employment of the rings 29.

It will thus be noted from the foregoing description and accompanying drawings that the improved types and modifications of truck bed construction produces one which may be effectively and conveniently used for hauling all kinds of drayage.

The dumping feature will be greatly appreciated when traversing rough highways due to the fact that the weight of the load will be equally distributed upon the sides of the chassis thereby obviating overloading either side of the vehicle, especially the down or right side.

The invention is susceptible of various changes in its form, proportions and minor details of construction, and the right is herein reserved to make such changes as properly fall within the scope of the appended claims.

Having thus described the invention, what is claimed is:—

1. A truck bed construction comprising a supporting frame, plate members carried upon the sides of the supporting frame and extended appreciable distances beyond the extremities thereof, bolster stakes arranged between the plates, rod members extended through the plates and bolsters to swingably mount the latter thereon, siding carried by the stakes, plate members carried upon the ends of the bolsters and having hooks upon the extremities thereof, plate members carried upon the outer sides of the stakes being provided with sleeve portions, locking rods mounted within the sleeve portions having hooks adapted for engagement with the aforementioned hooks, and crank portions carried upon the opposed ends of the locking rods.

2. A truck bed construction comprising a supporting frame, plate members carried upon the sides of the supporting frame and extended appreciable distances beyond the extremities thereof, bolster stakes arranged between the plates, rod members extended through the plates and bolsters to swingably mount the latter thereon, siding carried by the stakes, plate members carried upon the ends of the bolsters and having hooks upon the extremities thereof, plate members carried upon the outer sides of the stakes being provided with sleeve portions, locking rods mounted within the sleeve portions having hooks adapted for engagement with the aforementioned hooks, crank portions carried upon the opposed ends of the locking rods, and means for holding the crank portions of the operating rods against displacement.

3. A truck bed construction comprising a supporting frame, plate members carried upon the sides of the supporting frame and extended appreciable distances beyond the extremities thereof, bolster stakes arranged between the plates, rod members extended through the plates and bolsters to swingably mount the latter thereon, siding carried by the stakes, plate members carried upon the ends of the bolsters and having hooks upon the extremities thereof, plate members carried upon the outer sides of the stakes being provided with sleeve portions, locking rods mounted within the sleeve portions having hooks adapted for engagement with the aforementioned hooks, crank portions carried upon the opposed ends of the locking rods, and means for holding the crank portions of the operating rods against displacement.

In testimony whereof I affix my signature.

JAMES R. FELL.